United States Patent
Florian et al.

[15] 3,664,488
[45] May 23, 1972

[54] COLLAPSIBLE BELT CONVEYOR

[72] Inventors: Jaroslav Florian, Kralupy N. Vltavou; Ladislav Binovec, Prague, both of Czechoslovakia

[73] Assignee: Vyzkumny ustav pozemnick staveb

[22] Filed: Nov. 25, 1969

[21] Appl. No.: 879,814

[52] U.S. Cl. ............................................ 198/139, 198/233
[51] Int. Cl. ........................................................ B65g 15/26
[58] Field of Search ............................ 198/139, 233, 192

[56] References Cited

UNITED STATES PATENTS

| | | |
|---|---|---|
| 3,228,516 | 1/1966 | Sheehan .............................. 198/139 |
| 2,858,933 | 11/1958 | Hardy .................................. 198/139 |
| 2,858,934 | 11/1958 | Carlson ................................ 198/139 |
| 3,125,209 | 3/1964 | Butler ............................... 198/139 X |

Primary Examiner—Edward A. Sroka
Attorney—Arthur O. Klein

[57] ABSTRACT

A readily collapsible belt conveyor wherein the ends of the belt are carried and driven at spaced abutment supports which are moved relatively toward each other when the conveyor is collapsed into inoperation condition. The runs of the belt are supported on normally longitudinally spaced roller stands, mounted on supporting ropes, the stands being movable close together when the conveyor is collapsed. The construction of the conveyor is such that it may be collapsed, and moved if desired, without cutting or disconnecting the belt.

1 Claim, 5 Drawing Figures

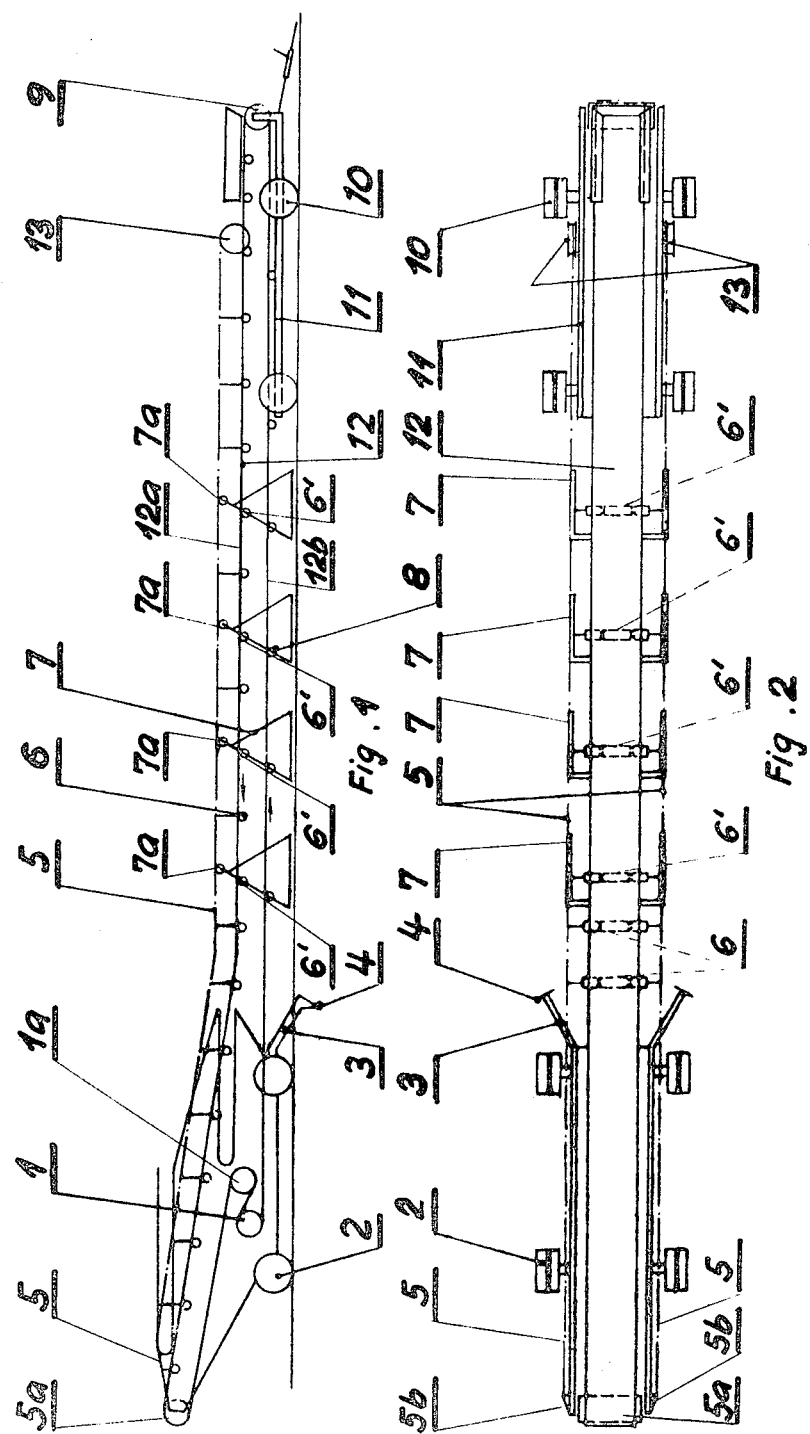

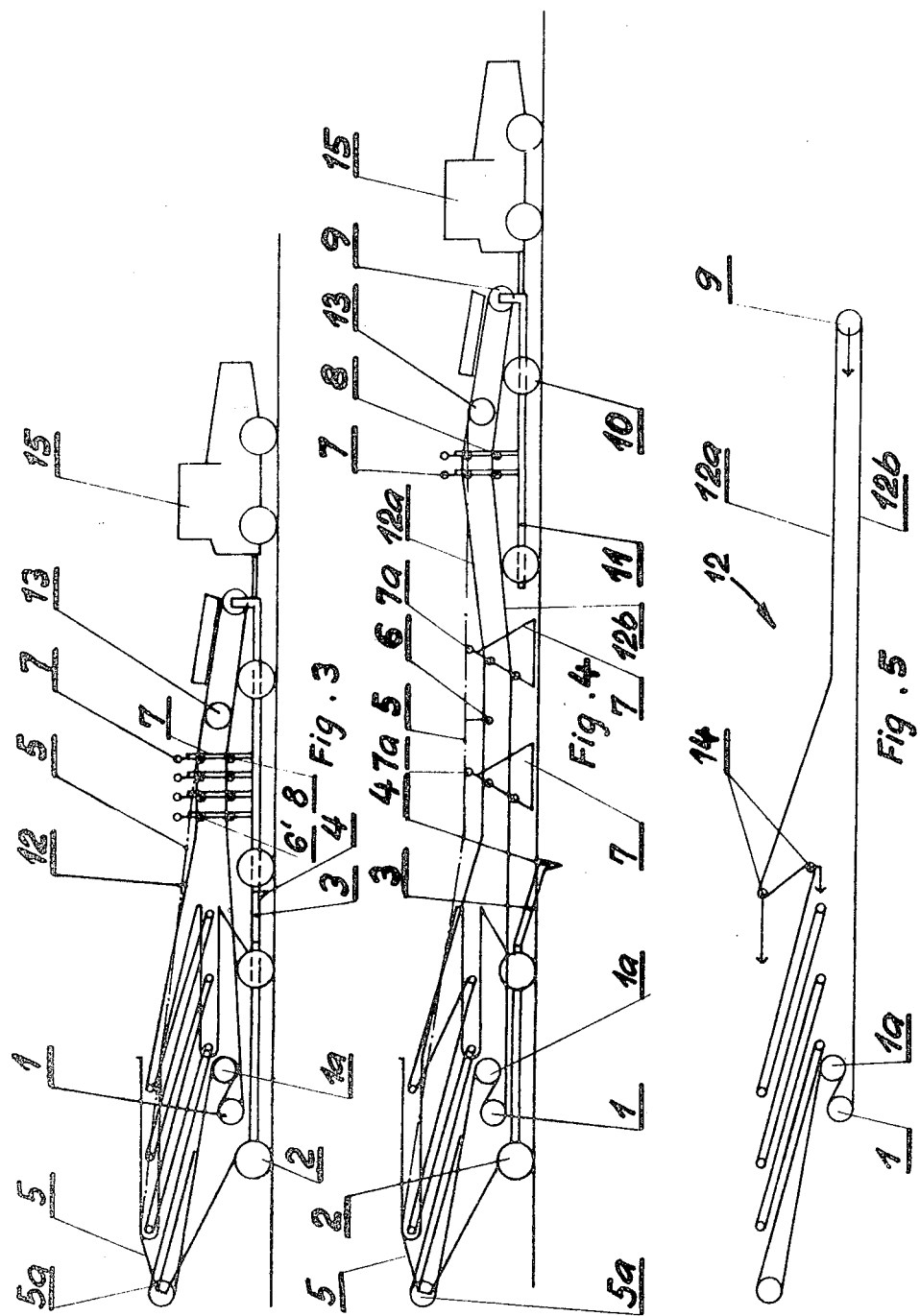

COLLAPSIBLE BELT CONVEYOR

This invention relates to a belt conveyor, especially for roller conveyors with abutment supports and suspended roller stands, the conveyor being readily collapsible without breaking, cutting, or disconnecting the belt, and being of such construction that it may be quickly set up when desired.

Existing types of belt conveyors can not be speedily assembled, dismantled, and moved without breaking or cutting the belt. There is a need, especially in the building industry, for conveyors which may be disassembled or collapsed, transported, and set up at a new working site. In many cases belt conveyors can not be used for such purpose, because the time for dismantling, moving, and reassembling them would be too long. Also, the very substantial length of such belt conveyors requires that they be disassembled into a substantial number of parts, which adds to the labor of moving the conveyor from one location to another. Added to this is the cost of restringing the belt and making a new joint or bond in it, as by the hot cure method in the case of rubber belts.

The belt conveyor of the present invention overcomes the above outlined disadvantages of prior belt conveyors by being readily collapsible without breaking or cutting the belt, readily transportable, and quickly set up at a new working site. The conveyor of the invention has abutment supports which are longitudinally spaced when the conveyor is set up in working condition. The abutment supports carry belt entraining rolls, at least one of which is driven, the belt being supported between abutments by retractible roller stands supported on longitudinally extending ropes. Preferably the abutment supports are in the form of movable carriages which are caused to approach each other upon the collapsing of the conveyor. The carriages may be connectable to each other, and present between them a storage platform for supporting the retracted roller stands and the conveyor belt in the form of folded or festooned loops.

In the accompanying drawings there is shown an illustrative preferred embodiment wherein the abutment supports are in the form of wheeled vehicles. It is to be understood that the drawings are exemplary and not limiting.

IN THE DRAWINGS

FIG. 1 is a view in side elevation of the conveyor in working condition;

FIG. 2 is a view in plan of the conveyor;

FIG. 3 is a view in side elevation of the conveyor of FIGS. 1 and 2 in collapsed condition and connected to a towing vehicle;

FIG. 4 is a view in side elevation of the conveyor as it is being set up at a new working site; (it will also appear the same as it is being collapsed toward the condition of FIG. 3) and FIG. 5 is a schematic view in side elevation illustrating the manner of forming loops in the belt during the process of dismantling or collapsing the conveyor.

Turning now to FIGS. 1 and 2, the conveyor is shown as having a first abutment support 2, in the form of a first wheeled carriage, and a second abutment support 10, in the form of a second wheeled carriage having an elongated frame 11. The abutment supports are shown spaced from each other, and the conveyor belt 12 extended in operative condition. It is to be understood that the abutment supports, depending upon the conditions of use of the conveyors, may be caterpillar tread mounted carriages, skids, pontoons, and the like. The abutment support 2 is maintained against movement to the right in FIG. 2 by swinging supports 3 which have ends 4 which dig into the earth to brace the support. The abutment support 10 is shown in FIG. 1 as anchored to the earth by a cable provided with a turnbuckle.

The belt 12, which has parallel upper and lower runs 12a and 12b, respectively, is stretched between abutment supports 2 and 10 when the conveyor is assembled in operative condition as shown in FIGS. 1 and 2. It will be assumed that the upper run of the belt travels from right to left, as shown by the arrows, although it may, of course, be driven in the reverse direction. In its travel, the belt, after reaching an idle drum 5a at the left, passes downwardly and to the right to belt driving drums 1, 1a, on abutment support 2, which are driven by motive means not shown. After leaving drums 1, 1a, the lower run 12b of the belt travels to the right until it passes around a drum 9, on abutment support 10, to return to the right hand end of upper run 12a. The drum 9 may be idle or driven, as desired.

When the conveyor is in the position of FIGS. 1 and 2, the upper run 12a of the belt is supported by a plurality of longitudinally spaced upper roll stands comprising transverse rollers 6 which underlie the upper run 12a of the belt, the upper stands being supported at their ends by longitudinally extending ropes or cables 5. The ropes extend from points of attachment 5b on abutment support 2 to the right to a wind-up drum 13. The ropes 5 are supported in their runs between abutment supports 2 and 10 by longitudinally spaced collapsible supporting stands 7 which rest on the ground between abutment supports 2 and 10. Besides being supported by the rollers 6 the upper run 12a of the belt 12 is also supported by the rollers 6' which are detachably connected to the supports 7. At their upper ends the stands 7 carry rollers 7a which underlie and support the ropes 5, permitting a necessary small movement of the upper roll stands with their rollers 6 therepast if a correction of the tension of the ropes 5 has to be effected. The lower roll stands 7 also carry transverse rollers 8 which underlie and support the lower run 12b of the conveyor belt, as shown in FIGS. 1 and 2.

When the conveyor is to be collapsed preparatory to being moved to a new working site, the tension of the belt 12 is released and the two abutment supports 2, 10 are moved relatively toward each other, as by connecting a tractor 15 to the abutment support 10 and pushing such support toward abutment support 2, as shown in FIG. 4. As the supports 2 and 10 approach each other, the ropes 5 are wound up on the drum 13, and the upper roll stands bearing the rollers 6 are removed from the ropes 5 and are deposited either on the elongated frame or body 11 of the abutment support 10 or are put aside for separate transportation. The rollers 6' remain on the stands 7. The rollers 8 may rest on the supports 7 as shown in FIG. 3 or can be disconnected from them preferably beginning at the left where the belt 12 is then progressively formed into loops as shown in FIG. 4. The loops are formed about members 14 e.g., subsidiary rolls or pipes which are thrust through the loops after they have been formed, the ends of the members 14 being supported in suitable side frame members, not shown, on abutment support 2. The members 14 are retained in the loops of the belt during its transportation, to prevent its breakage.

While the abutment supports 2 and 10 are being brought toward each other, the supports 7 are deposited on the elongated frame 11 of the abutment support 10. Finally, when supports 2 and 10 have moved sufficiently toward each other, the frame 11 is connected to the swinging members 3, which contain clamps for that purpose. The frame 11 can, of course, be connected directly to the support 2 by conventional means. After the belt 12 has been looped, it will be fastened in that condition by ropes or the like. The supports 2 and 10, the frame 11, and the tractor 15 are thus connected to form a unit which travels to the new operating site. The folded frames 7 and other appurtenant mechanism may be carried on the frame 11, as shown, or on a special frame.

When the connected units 2, 10, 11 and 15 have reached the new working site, the abutment supports 2, 10 are disconnected, and the support 2 is preliminarily anchored. The support 10 is then moved away from support 2, the ropes 5 being wound off the drum 13, and the belt 12 being progressively released from its loops. The wind up drum 13 may be provided with a brake so that the ropes 5 are tensioned as they are unwound. The supports 7 are progressively replaced at the proper spacing, and the ropes 5 are then supported on them. The upper supports with their rollers 6 are then replaced beneath the upper run 12a of the belt 12, i.e., suspended on the ropes 5.

After the belt 12 and ropes 5 have been unwound, the abutment support 10 is anchored so that the belt and ropes are tensioned. After suitable adjustment of such tensions the conveyor is ready for operation.

The abutment supports 2 and 10 may, of course, themselves be without wheels or other means of locomotion, and may be carried on trailers, trucks, or boats from one site to another.

The belt conveyor according to the invention has many advantages. It can with special advantage be employed in medium and long-length live roller conveyors. The belt is not damaged, as it would be by repeated breakings and joinings with conventional collapsible belt conveyors. There is no danger of breaking of the belt at the joint, nor is there required any wind-up reels or auxiliary equipment for the winding up of the disconnected belt. The conveyor of the invention may be collapsed or assembled in only one-quarter of the time required for conventional conveyors. Conveyors in accordance with the invention may be either large or small, showing the same advantages in all sizes.

What is claimed is:

1. In a belt conveyor which is longitudinally collapsible without disconnecting the belt and having normally longitudinally spaced abutment supports, means on the abutment supports entraining the belt, longitudinally spaced upper roll stands supporting the upper run of the belt in its operative position and retractible bearer ropes stretches between the two abutment supports for supporting the upper roll stands, means for storing the belt in loops on one of the abutment supports when the abutment supports are in their collapsed position, the improvement comprising in combination collapsible roller stands supporting the belt in the position thereof between the abutment supports when the abutment supports are in their operative, normally spaced positions, said roller stands being removable when the conveyor is collapsed, a storage platform connected to one of the abutment supports for storing said roller stands when the conveyor is collapsed, means for securing the abutment supports together in their collapsed position for towing to a new site, means to anchor the respective abutment supports and to keep the conveyor belt in taut condition, the means on one of the abutment supports being ground engaging braces pivotally connected to the end of said one abutment support which confronts the other abutment support, the ground engaging ends of the braces being provided with means for connecting the abutment supports when the braces are raised and when the abutment supports are in their closely-spaced confronting positions.

* * * * *